Figure 1:
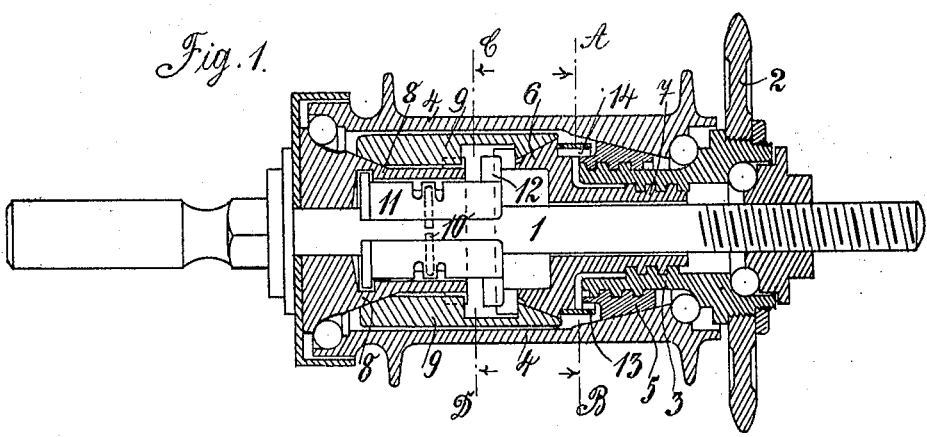

F. T. GOTTSCHALK.
DRIVING GEAR.
APPLICATION FILED JUNE 9, 1906.

Witnesses
Thomas Durant
Melville W. Church

Inventor:
Friedrich T. Gottschalk
by Church & Church
his Attys

UNITED STATES PATENT OFFICE.

FRIEDRICH THEODOR GOTTSCHALK, OF DRESDEN, GERMANY.

DRIVING-GEAR.

No. 895,553.　　　Specification of Letters Patent.　　　Patented Aug. 11, 1908.

Application filed June 9, 1906. Serial No. 321,002.

*To all whom it may concern:*

Be it known that I, FRIEDRICH THEODOR GOTTSCHALK, a subject of the King of Saxony, residing at Dresden, in Saxony, Empire of Germany, have invented certain new and useful Improvements in or Relating to Driving-Gears, of which the following is a specification.

This invention relates to a gear which may be used as a free wheel clutch with back-pedaling brake, and which drives when rotating forwards, and brakes when rotating backwards, said gear belonging to that class in which the driving part, according to its direction of rotation, by means of screw-threads, either releases the brake and puts in the driving clutch, or throws out the driving clutch and applies the brake. While, however, in the constructions heretofore known the same screw threads operated both the driving clutch and the brake by the movement of a nut (coupling cone) the screw-threaded part according to this invention, is a hollow cylinder provided with screw threads both inside and outside, and nuts engage with both screw threads, one of the said nuts bringing about only the driving, and the other one only the application of the brake. Various advantages are obtained by this division of labor. First of all, the play between the driving and the braking can be regulated as desired, or the play which has been increased by wear, can be brought back to the original extent, by placing the two nuts into a corresponding relative position, when putting the clutch together. It is also possible to have a different pitch for the two screw-threads, that is to say, to make the paths for the throwing into gear and for the application of the brake, different under equal conditions, in order to put on the brake slower but with all the greater power. The construction according to this invention also makes it possible to make either of the two screw-threads left or right handed, so that in some cases there is more latitude as regards construction. It should also be remembered that, when there is only one screw thread or two screw-threads of the same hand, the screw-threaded part when the clutch is thrown into gear, experiences a longitudinal back pressure in one direction, and when the brake is applied, a similar pressure in the other direction, while when there are two screw-threads of different hand, the longitudinal back pressure is always in one and the same direction. It depends, of course, on the application of the construction according to this invention, whether and to what extent use is made of the above mentioned possibilities. Finally, there is less wear in gear according to this invention as each screw-thread is subjected to a strain only in one direction (pressing the driving clutch, pressing the brake).

Figure 2:
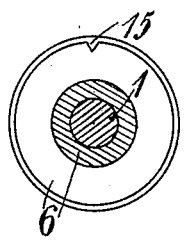
Figure 3:
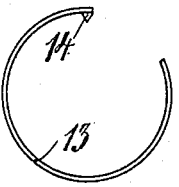
Figure 4:
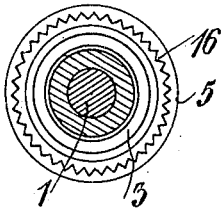
Figure 5:
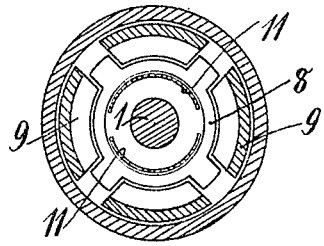
Figure 6:
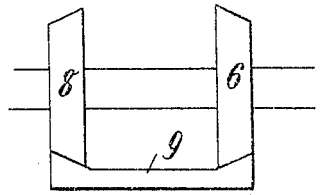

A construction of a gear according to this invention embodied as a free wheel clutch is illustrated in Figure 1 in longitudinal section: Fig. 2 is a section on line A—B and shows the braking cone seen from the right but without the catch which falls in the section plane. Fig. 3 shows said catch detached: Fig. 4 the screw-threaded extension and the driving cone, seen looking to the right from the plane of section A B. Fig. 5 is a cross-section on line C—D. Fig. 6 is a view of a modification.

About the fixed spindle 1 rotates, as the driving member, a chain wheel 2, fixed on a screw-threaded extension 3. The latter is a hollow cylinder provided inside and outside with screw-threads which, in the construction illustrated are of the same hand and pitch. The hub 4 represents the driven part, or the part to which the brake is to be applied.

The driving is effected by means of the coupling cone 5 on the outer screw-thread, which cone, when the driving part 2 3 rotates to the right, is forced into the corresponding hollow cone of the driven part 4.

The braking is effected by means of the brake cone 6 engaging by means of a perforated bolt-shaped extension 7 with the inner screw-thread of the extension 3. The braking takes place in the usual manner, the braking cone 6, when the driving part 2 3 rotates towards the left, moving towards the left the brake wedges 9 guided on the fixed abutment cone 8 and thus, owing to the wedge action, forcing them radially outwards and against the inner surface of the hub 4.

In order to insure the movement of the cones 5 and 6, it is necessary to prevent them in some way from participating in the rotation of the driving part. As shown in the drawing, this is effected in well known manner by connecting them by means of a sliding coupling to the fixed parts of the gear. The coupling is constituted by sheet metal cups 11 mounted in the hollow space of the brake abutment 8 and held apart and against the wall of the hollow space by means of a spring 10, the said cups 11 engaging, by means of a projection 12, with recesses in the cylindrical end of the brake cone 6. This cylindrical end serves also for positively withdrawing the brake wedges in well known manner. The brake cone 6 is thus prevented from rotating with the screw threaded projection 3, and the fixing of the clutch cone 5 is effected by a catch preventing relative rotatory movement of the two cones. Such catch as provided, in the construction illustrated, comprises a projection 14 on the spring ring 13 (Figs. 1 and 3) which projection at the same time engages with a notch 15 of the brake cone (Fig. 2) and with one of the notches of the toothed rim 16 (Fig. 4) mounted on the left hand end of the coupling cone 5. The toothed rim makes a relative shifting of the cones 5 and 6 possible when the gear is being mounted, for the purpose of altering the clearance between the driving and the braking.

It will be seen from Fig. 6, how the gear can be provided with screw-threads of different hand without much alteration of the other members of the gear. It is merely necessary to reverse the brake cone 6 and the abutment cone 8, that is to say, to arrange the cone points which in Fig. 1, are facing each other, away from each other, whereupon, when the brake wedges are pulled to the right (instead of pushing them to the left), the brake will be applied by the left hand inner screw thread.

What I claim as my invention and desire to secure by Letters Patent is:—

1. In a braking and driving mechanism the combination with a driven member, of a driving member, a longitudinally movable cone member adapted to engage the driven member, a second longitudinally movable cone member, braking wedges with which said second cone member engages and means carried by said driving member whereby each cone member may be positively moved independently in the same direction; substantially as described.

2. In a braking and driving mechanism, the combination with a driven member, of a rotary drive member, having an external and an internal screw thread, a longitudinally movable cone member operatively engaged with the external thread of the drive member, a second longitudinally movable cone member operatively engaged with the internal thread, and braking wedges engaged by the second cone member; substantially as described.

3. In a braking and driving mechanism, the combination with a driven member of a driving member, a longitudinally movable cone member adapted to engage the driven member, a second longitudinally movable cone, longitudinally and radially movable braking wedges with which said second cone member engages and means carried by said driving member whereby each cone may be moved positively independently of the other.

4. In a braking and driving mechanism, the combination with a driven member, of a rotary drive member having internal and external screw threads of opposite inclination, a longitudinally movable cone member operatively engaged with the external thread, a second longitudinally movable cone member engaged with the internal thread and braking wedges engaged by the second cone member.

5. In a gear of the kind described, and in combination, a driven member, a driving wheel, an internally and externally screw-threaded cylindrical member rigidly secured to the driving wheel, a coned member adapted to engage with the driven member, and adjustably engaged on the external thread of said cylindrical member, a second coned member having a screw-threaded extension engaging the inner thread of said cylindrical member and braking wedges having inclined faces engaged with said second coned member substantially as described.

6. In a gear of the kind described, and in combination, a driven member, a driving wheel, an internally and externally screw-threaded cylindrical member rigidly secured to the driving wheel, a coned member adapted to engage with the driven member, and adjustably engaged on the external thread of said cylindrical member, a second coned member having a screw-threaded extension engaging the inner thread of said cylindrical member, braking wedges having inclined faces engaged with said second coned member means to prevent rotatory movement of one coned member and means to prevent relative rotatory movement of the two coned members, substantially as described.

7. In a gear of the kind described, and in combination, a driven member, a driving wheel, an internally and externally screw-threaded cylindrical member rigidly secured to the driving wheel, a coned member adapted to engage with the driven member, and adjustably engaged on the external thread of said cylindrical member, a second coned member having a screw-threaded extension engaging the inner thread of said cylindrical member, braking wedges having inclined faces engaged with said second coned member, means to prevent rotatory movement of said second coned member and a spring ring fixed on said coned member having a catch engaged with a toothed rim of the first coned member, substantially as described.

In testimony whereof I have signed my name to this specification in the presence of two subscribing witnesses.

FRIEDRICH THEODOR GOTTSCHALK.

Witnesses:
OTTO HOEFF,
RICHARD IFFERTE.